(12) United States Patent
Bohannon

(10) Patent No.: US 10,190,013 B2
(45) Date of Patent: Jan. 29, 2019

(54) STAIN COMPOSITION

(71) Applicant: AXALTA COATING SYSTEM IP CO., LLC, Wilmington, DE (US)

(72) Inventor: James M. Bohannon, High Point, NC (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 14/707,555

(22) Filed: May 8, 2015

(65) Prior Publication Data

US 2015/0299491 A1 Oct. 22, 2015

Related U.S. Application Data

(63) Continuation of application No. 13/131,655, filed as application No. PCT/US2009/068167 on Dec. 16, 2009, now abandoned.

(60) Provisional application No. 61/203,074, filed on Dec. 18, 2008.

(51) Int. Cl.
C09D 15/00 (2006.01)
C08K 3/34 (2006.01)
C09D 175/04 (2006.01)

(52) U.S. Cl.
CPC .............. C09D 15/00 (2013.01); C08K 3/34 (2013.01); C09D 175/04 (2013.01)

(58) Field of Classification Search
None
See application file for complete search history.

(56) References Cited

U.S. PATENT DOCUMENTS

| 5,395,436 A | 3/1995 | Setzke |
| 5,746,778 A | 5/1998 | Jankewitz et al. |
| 2005/0192400 A1* | 9/2005 | Killilea ............... C08G 18/672 524/591 |
| 2006/0029825 A1 | 2/2006 | Chen et al. |
| 2006/0210153 A1 | 9/2006 | Sara et al. |
| 2006/0223935 A1* | 10/2006 | Fasano ................. C08F 220/18 524/501 |
| 2007/0031648 A1 | 2/2007 | Dean et al. |
| 2007/0142520 A1 | 6/2007 | Pogue |
| 2007/0256256 A1* | 11/2007 | Dean ....................... C09D 5/28 8/543 |
| 2007/0269254 A1 | 11/2007 | Clarke |
| 2008/0009601 A1 | 1/2008 | Killilea et al. |
| 2008/0041003 A1 | 2/2008 | Nowak et al. |
| 2008/0245259 A1 | 10/2008 | Chowdhry et al. |
| 2008/0276387 A1 | 11/2008 | Hertz et al. |

FOREIGN PATENT DOCUMENTS

| DE | 19923212 | 11/2000 |
| JP | 2000109741 A | 4/2000 |
| WO | 92/11326 | 7/1992 |
| WO | 9906459 | 2/1999 |

* cited by examiner

Primary Examiner — Jeffrey D Washville
(74) Attorney, Agent, or Firm — Lorenz & Kopf, LLP

(57) ABSTRACT

A stain composition comprising at least one anti-ticking agent, at least one colorant, and at least one surfactant configured to at least partially suspend the hydrous aluminum silicate in a carrier liquid.

15 Claims, 1 Drawing Sheet

STAIN COMPOSITION

CROSS-REFERENCE TO RELATED APPLICATION(S)

This application is a continuation of pending U.S. application Ser. No. 13/161,655, filed May 27, 2011, which is a 371 National Stage Application of International Application No PCT/US2009/068167, filed on Dec. 16, 2009, published as International Publication No. WO 2010/080416, and which claims priority to U.S. Provisional Application No. 61/203,074, filed on Dec. 18, 2008, each of which is referenced herein it its entirety.

FIELD

The present disclosure relates to compositions for providing stain finishes to substrates. In particular, the present disclosure relates to stain compositions having reduced ticking.

BACKGROUND

Paints and stains are often used to protect and decorate a variety of substrates. In comparison to paints, stains may be transparent or semitransparent suspensions of colorants in carrier liquids, and are typically designed to color a substrate without hiding it under an opaque film. Some stains are formulated to impart or transport the colorants into the pores of the substrate rather than creating a film on top of the substrate surface. As a result, the stained substrate is colored, but the grain pattern is generally not hidden. In contrast, paints are usually opaque solutions or suspensions of colorants in a carrier, which are designed to hide or cover a surface with an opaque film.

One problem with stains is that many substrates, such as wood substrates, may include soft and/or porous regions that may not be readily visible until a stain is applied. The colorants of conventional stains tend to soak into these regions, which may preferentially darken such regions due to the increased concentration of the colorants. This can result in a sharp color contrast to the remaining surface of the substrate, referred to as "ticking" While this contrast may be desirable for some applications, many consumers prefer a more uniform distribution of stain colorants. Thus, there is an ongoing need for stain compositions that may reduce color contrasts in porous substrates, such as wood substrates.

SUMMARY

In one embodiment, the present invention provides a stain composition that includes at least one anti-ticking agent, at least one colorant, and at least one surfactant configured to at least partially suspend the hydrous aluminum silicate in a carrier liquid. Preferably, the anti-ticking agent has a concentration in the stain composition of at least about 3.0% by weight, based on an entire weight of the stain composition.

In another embodiment, the present invention provides a stain composition that includes a clay material, at least one colorant, a polymeric binder, and at least one surfactant configured to at least partially suspend the clay material in a carrier liquid. Preferably, the clay material has an average particle size of about 2.0 micrometers or less, and has a concentration in the stain composition of at least about 3.0% by weight, based on an entire weight of the stain composition.

In yet another embodiment, the present invention provides a method of preparing a stain composition. The method includes at least partially suspending at least one anti-ticking agent in a first carrier liquid to form an inert suspension. The method further includes suspending at least one surfactant in a second carrier liquid, introducing the inert suspension to the second carrier liquid containing the at least one suspended surfactant, and introducing at least one colorant to the second carrier liquid containing the at least one suspended surfactant. Preferably, the anti-ticking agent has a concentration in the prepared stain composition of at least about 3.0% by weight, based on an entire weight of the prepared stain composition.

DETAILED DESCRIPTION

Figure 1:
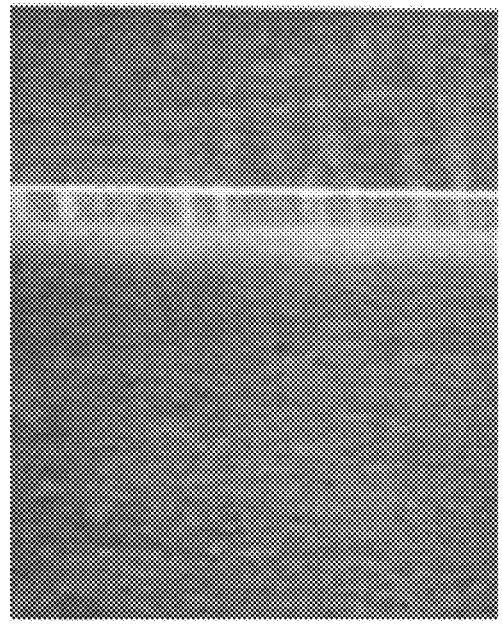
FIG. 1 is a photograph of a wood substrate coated with an exemplary stain composition of the present disclosure and additional clearcoats.

The present disclosure is directed to a stain composition that may be used to impart one or more colorants to a substrate (e.g., a wood substrate) while also desirably preserving the aesthetic qualities of the substrate (e.g., wood grains). The stain composition preferably includes one or more anti-ticking additives (e.g., hydrous aluminum silicates), one or more colorants, optionally one or more polymeric binders, and one or more surfactants, each of which may be at least partially suspended in a carrier liquid (e.g., water). As used herein, the terms "suspend", "suspended", "suspending", "suspension", and the like, with reference to a solid or partially solid material in a carrier liquid, refer to the material being dispersed, dissolved, solubilized, emulsified, and/or otherwise generally uniformly distributed in the carrier liquid.

The stain composition may be applied to a variety of different substrates. Examples of suitable substrate materials include wood, cement, cement fiber board, wood-plastic composites, tile, metal, plastic, glass, and fiberglass. The stain composition is particularly suitable for use with wood substrates. As discussed above, many substrates, such as wood substrates, may include soft and/or porous regions of the substrate surfaces, which may not necessarily be visible prior to staining. These "soaker" regions can absorb substantial concentrations of conventional stain colorants, potentially resulting in darker regions where the stain colorants are concentrated. These darker regions correspondingly can exhibit sharp color contrasts relative to the remaining surface regions of the substrates (i.e., ticking).

While not wishing to be bound by theory, it is presently believed that to reduce ticking, the stain composition of the present disclosure desirably forms a network of the anti-ticking additives, which may at least partially cover one or more of the pores and soft regions of a substrate. This network desirably restricts uneven penetration of the colorants into the substrate to distribute the colorants in a more uniform manner. The resulting stained substrate may thereby exhibit a more uniform color with less contrast, and may provide more hold out and fullness with a subsequent sealer and overcoat.

Suitable anti-ticking additives include silicate-based materials (e.g., phyllosilicate materials), wax-based silicates, and combinations thereof. Suitable silicate-based materials include serpentine silicates, clay mineral silicates, mica silicates, and combinations thereof. Preferred phyllosilicate materials include clay mineral silicates, such as aluminum-based clay silicates (e.g., kaolinites and pyrophyllites), magnesium-based clay silicates (e.g., talc), aluminum/magnesium-based clay silicates (e.g., illites, montmorillonites, and vermiculites), and combinations thereof. Suitable aluminum-based clay silicates include chemical compositions of aluminum oxide (Al2O3) and silicon dioxide (SiO2), and may also include hydrates thereof. Preferred aluminum-based clay silicates include chemical compositions of aluminum oxide (Al2O3), silicon dioxide (SiO2), and water (H2O), such as hydrous aluminum silicates (e.g., Al2O3.2SiO2.2H2O) and Al2Si2O5(OH)4. Suitable magnesium-based clay silicates include chemical compositions of magnesium oxide (MgO) and silicon dioxide (SiO2), and may also include hydrates thereof. Preferred magnesium-based clay silicates include chemical compositions of Mg3Si4O10(OH)2), such as plating-talc materials.

The anti-ticking additives desirably exhibit fine-grain average particle sizes to assist forming a network to cover the pores and soft regions of a receiving substrate. Preferred average particle sizes of the anti-ticking additives include particle sizes of about 2.0 micrometers or less, more preferably sizes of about 1.0 micrometer or less, and most preferably sizes of about 0.5 micrometers or less. Examples of suitable commercially available anti-ticking additives include those available under the trade designations "ASP" hydrous aluminosilicates from BASF Corporation, Florham Park, N.J.

Some conventional paints may incorporate small concentrations of clay materials to function as spacers (i.e., extender pigments) for materials such as titanium dioxide (TiO2). Such uses of the clay materials may allow lower concentrations of titanium dioxide to be used, thereby reducing material costs. However, these spacer clays also typically increase the opacities of the resulting compositions (e.g., milky white opacities), which may be desirable for paints, but is generally undesirable for stains. In comparison, preferred silicate-based materials incorporated in the stain composition of the present disclosure have fine-grain particles, as discussed above. This desirably limits the opacifying effect of the silicate-based materials. This may correspondingly reduce the milky-white opacity effects, and allow the stain composition to exhibit a variety of colors, including dark colors (e.g., espresso-colored stains).

The anti-ticking agent is desirably present in the stain composition in a suitable concentration to assist in restricting uneven penetration of the colorants into a receiving substrate. Preferred concentrations of the anti-ticking agent in the stain composition include concentrations of at least about 3% by weight, more preferably from about 4% by weight to about 15% by weight, and most preferably from about 5% by weight to about 10% by weight, based on an entire weight of the stain composition. As discussed below, in one embodiment, the anti-ticking agent may be provided to the stain composition in a premixed inert suspension.

As discussed above, the stain composition of the present disclosure may also include one or more colorants, where the colorants may impart colors to the receiving substrate. Suitable colorants for the stain composition may include any color-imparting material (e.g., prime pigments, extender pigments, and dyes), such as titanium oxides (e.g., titanium dioxide), zinc oxides, iron oxides, copper chromium, strontium chromate, barium sulfate, carbon black, organic tints (e.g., organic yellows, reds, and blacks), burnt umber, and combinations thereof. Preferred concentrations of the colorants in the stain composition range from about 1% by weight to about 10% by weight, more preferably from about 2% by weight to about 5% by weight, based on the entire weight of the stain composition.

In some embodiments, the concentration of the anti-ticking agent in the stain composition may be greater than the combined concentrations the colorants. This may assist in restricting the uneven penetration of the colorants into the substrate to distribute the colorants in a more uniform manner, as discussed above. Preferred concentrations of the anti-ticking agent in the stain composition include concentrations of at least about 5% by weight greater than the combined concentrations the colorants, more preferably at least about 10% by weight greater than the combined concentrations the colorants, and most preferably at least about 15% by weight greater than the combined concentrations the colorants, based on the combined concentrations of the colorants in the stain composition.

It is noted that these concentrations of the anti-ticking agent in the stain composition are made with reference to the combined concentrations of the colorants in the stain composition. Thus, in an embodiment in which the combined concentrations of the of the colorants in the stain composition is about 5.0% by weight, and the concentration of the anti-ticking agent in the stain composition is about 10.0% by weight greater than the combined concentrations the colorants, the resulting concentration of the anti-ticking agent in the stain composition is about 5.5% by weight.

The stain composition may also include one or more polymeric binders, where the polymer binders may compositionally include a variety of different materials for binding the anti-ticking agent and the colorants to the substrate. Suitable materials for the polymeric binders include acrylic resins, polyurethane resins, polyester resins, epoxy-functional resins, thermoplastic resins, copolymers thereof, and combinations thereof. Suitable concentrations of the polymeric binders in the stain composition range from about 3% by weight to about 25% by weight, with particularly suitable concentrations ranging from about 5% by weight to about 15% by weight, based on the entire weight of the stain composition.

In some embodiments, the polymeric binders may include a polyurethane copolymer resin having urethane linkages and optionally, one or more non-urethane, cross-linkable groups. As used herein, the term "copolymer" refers to a polymeric material having two or more monomer species. Suitable polyurethane copolymer resins include one or more isocyanate-functional compounds and one or more polyhydric alcohols, where the isocyanate-functional compounds and the polyhydric alcohols may be reacted (e.g., cured) to form the urethane linkages. Examples of suitable polyurethane copolymer resins for the polymeric binders include those disclosed in Killilea et al., US Patent Application Publication No. 2008/0009601, the disclosure of which is incorporated by reference in its entirety. In the case of any inconsistencies, the present disclosure, including any definitions herein, will prevail.

Examples of suitable compounds for the isocyanate-functional compounds include aliphatic isocyanates, cycloaliphatic isocyanates, aromatic isocyanates, and combinations thereof. The isocyanate-functional may include one or more isocyanate groups, and desirably includes two or more isocyanate groups (e.g., diisocyanates). Examples of particularly suitable compounds for the isocyanate-functional compound(s) include tetramethylene diisocyanates, hexamethylene diisocyanates, cyclohexamethylene methylene cyclohexyl isocyanates, isophorone diisocyanates, toluene diisocyanates, methylene diphenyl diisocyanates, methylene diphenyl diisocyanates, phenylene diisocyanates, and combinations thereof.

In one embodiment, the isocyanate-functional compounds may be at least partially blocked with one or more blocking agents. More desirably, the isocyanate-functional compounds may be fully blocked with blocking agents such that substantially no free isocyanate groups are available until exposed to high temperatures during a curing process. Examples of suitable blocking agents include aliphatic alcohols (e.g., methanol, ethanol, and n-butanol), cycloaliphatic alcohols (e.g., cyclohexanol), aromatic-alkyl alcohols (e.g., phenyl carbinol and methylphenyl carbinol), glycol ethers (e.g., ethylene glycol butyl ether, diethylene glycol butyl ether, ethylene glycol methyl ether, and propylene glycol methyl ether), oximes (e.g., methyl ethyl ketoxime, acetone oxime, and cyclohexanone oxime), lactams (e.g., epsilon-caprolactam), and combinations thereof.

Suitable polyhydric alcohols for reacting with the isocyanate-functional compounds include polyether polyols, polyester polyols, polyurea polyols, polyamide polyols, polycarbonate polyols, alkyd-based polyols, copolymers thereof, and combinations thereof. Examples of suitable polyhydric polyols for use in forming alkyds include neopentyl glycol, glycerol, trimethylol propane, trimethylol ethane, trimethylol butane, pentaerythritol, diglycerol, diethylene glycol, and combinations thereof.

The concentrations of the isocyanate-functional compounds and the polyhydric alcohols may be proportioned such that the molar ratios of isocyanate groups to hydroxyl groups (NCO:OH ratio) are over-indexed, substantially even, or under indexed. Accordingly, examples of suitable NCO:OH molar ratios range from about 0.6:1.0 to less than 1.5:1.0. In some embodiments, the molar ratios of isocyanate groups to hydroxyl groups (NCO:OH ratio) may be over-indexed to provide suitable curing conditions. In these over-indexed embodiments, examples of suitable NCO:OH molar ratios range from greater than about 1.0:1.0 to about 1.5:1.0, with examples of particularly suitable NCO:OH molar ratios ranging from greater than about 1.0:1.0 to about 1.3:1.0. Alternatively, in some embodiments, the molar ratios of isocyanate groups to hydroxyl groups (NCO:OH ratio) may be under-indexed, which may provide good flexibilities and adhesion properties. In these under-indexed embodiments, examples of suitable NCO:OH molar ratios range from about 0.6:1.0 to less than about 1.0:1.0, with particularly suitable NCO:OH molar ratios ranging from about 0.7:1.0 to about 0.8:1.0.

Suitable non-urethane, cross-linkable groups of the polyurethane copolymer may include epoxy groups, ethylenically-unsaturated groups (e.g., vinyl groups), and combinations thereof. The non-urethane, cross-linkable groups desirably further facilitate curing of at least a portion of the polymeric binders to retain the anti-ticking agent and the colorants when applied to a substrate. The non-urethane, cross-linkable groups may be introduced into the polyurethane copolymers from any suitable reactant containing the non-urethane, cross-linkable groups, such as through incorporation of an ester polyol, a hydroxy-functional oil or fatty acid containing autooxidative carbon-carbon double bonds, alkyd-based polyols, fatty amines, and combinations thereof. The degree of saturation or unsaturation of the polyurethane copolymers may be tailored to facilitate a desired extent of crosslinking.

In embodiments in which the non-urethane, cross-linkable groups include ethylenically-unsaturated groups, the ethylenically-unsaturated groups desirably have one or more (meth)acrylate functionalities. The term "(meth)acrylate", as used herein, refers to an acrylate and a methacrylate functionality. Examples of suitable compounds having one or more (meth)acrylate functionalities for use in the peel-coat composition include methyl (meth)acrylates, ethyl (meth)acrylates, propyl (meth)acrylates, butyl (meth)acrylates, 2-ethylhexyl (meth)acrylates, hydroxyethyl (meth)acrylates, hydroxybutyl (meth)acrylates, cyclohexyl (meth)acrylates, acrylic acids, methacrylic acids, and combinations thereof.

Suitable molar concentrations of the urethane linkages and the non-urethane, cross-linkable groups in the resulting polyurethane copolymers may also vary depending on multiple factors, such as the desired extent of cross-linking. Preferred molar ratios of the urethane linkages to the non-urethane, cross-linkable moieties range from about 2.0:1.0 to about 0.5:1.0. Furthermore, preferred combined concentrations of the urethane linkages and the non-urethane, cross-linkable groups in the polyurethane copolymer range from about 50% by weight to 100% by weight, more preferably ranging from about 75% by weight to about 95% by weight, based on an entire weight of the polyurethane copolymer.

The polyurethane copolymer resin may also include one or more chain extenders to obtain higher molecular weights for the resulting polyurethane copolymer. Examples of suitable chain extenders include alkyl amino alcohols, cycloalkyl amino alcohols, heterocyclic amino alcohols, polyamines (e.g., ethylene diamine, diethylene triamine, triethylene tetra amine, melamine, etc.), hydrazine, substituted hydrazine, hydrazide, amides, amides, water, other suitable compounds having active hydrogen groups, and combinations thereof. Suitable concentrations of the chain extenders in the polyurethane copolymer resin may vary depending on the desired molecular weights of the resulting polyurethane copolymer.

The polymeric binders may also include one or more functional groups configured to assist in dispersing, dissolving, solubilizing, emulsifying, or otherwise suspending the polymeric binders in the carrier liquid. Examples of suitable functional groups include salt groups, salt-forming groups, and combinations thereof (e.g., acidic groups and basic groups). Examples of suitable compounds having active hydrogen and acid groups include hydroxy and mercapto carboxylic acids, aminocarboxylic acids, aminohydroxy carboxylic acids, sulfonic acids, hydroxy sulfonic acids, aminosulfonic acids, and combinations thereof. Examples of suitable compounds having active hydrogen and basic groups include aliphatic, cycloaliphatic and heterocyclic amino alcohols, diols and triols, amines, diamines, triamines, tetramines, amides, and combinations thereof.

The polymeric binders may undergo a curing reaction under a variety of different conditions, such as air curing, photocuring, thermal curing, and combinations thereof. Accordingly, in some embodiments, the stain composition of the present disclosure may also include one or more catalysts configured to initiate the desired curing reaction. The catalysts are also desirably present in concentrations to provide suitable curing rates and suitable extents of cross-linking. Preferred concentrations of the catalysts in the stain composition range from about 0.01% by weight to about 2.00% by weight, more preferably from about 0.10% by weight to about 1.00% by weight, based on the entire weight of the stain composition.

As discussed above, the stain composition of the present disclosure may also include one or more surfactants. Anti-ticking agents, such as hydrous aluminum silicate, and many colorants (e.g., pigments) typically exhibit low or no solubility in carrier liquids, particularly in aqueous carriers. Thus, the surfactants desirably assist in dispersing, dissolving, solubilizing, emulsifying, or otherwise suspending one or more of the hydrous aluminum silicate, the colorants, the polymeric binders, and any additional additives in the carrier liquid. Suitable surfactants for use in the stain composition include wetting agents, emulsifying agents, suspending agents, dispersing agents, and combinations thereof.

Examples of suitable surfactants for use in the stain composition include non-ionic and anionic surfactants, organosilicone compounds, fluorocarbon surfactants, and combinations thereof. Examples of commercially available surfactants for the stain composition include those available under the trade designations "DISPERBYK" from Byk USA, Inc., Wallingford, Conn.; under the trade designations "GEIGY AMINE C" from Ciba Specialty Chemicals, Basel, Switzerland; and under the trade designations "SURFYNOL" and "ENVIROGEM" from Air Products and Chemicals, Inc., Allentown, Pa. Preferred concentrations of the surfactants in the stain composition range from about 0.1% by weight to about 5.0% by weight, more preferably from about 0.1% by weight to about 2.0% by weight, based on the entire weight of the stain composition.

The carrier liquid may be any type of liquid suitable for transporting the solid materials of the stain composition, such as water, organic solvents, and combinations thereof. Preferred concentrations of the carrier liquid in the stain composition range from about 50% by weight to about 90% by weight, more preferably from about 70% by weight to about 80% by weight, based on the entire weight of the stain composition.

In one embodiment, the carrier liquid may be an aqueous carrier that includes water (i.e., a waterborne stain composition). The aqueous carrier may also include one or more organic solvents, which may increase evaporation rates and/or function as coalescent/film-forming aids. Examples of organic solvents for use in the aqueous carrier include methanol, ethanol, isopropyl alcohol, butyl alcohols (e.g., n-butanol), 2-butoxyethanol, 2-(2-butoxyethoxy)ethanol (i.e., butyl carbitol), aromatic solvents, isophorones, glycol ethers, glycol ether acetates, acetone, methyl-ethyl ketones (MEK), N,N-dimethylformamides, ethylene carbonates, propylene carbonates, diglymes, N-methylpyrrolidones (NMP), ethyl acetates, ethylene diacetates, propylene glycol diacetates, alkyl ethers of ethylene, propylene glycol monoacetates, toluene, xylenes, and combinations thereof. Preferred concentrations of the organic solvents in the aqueous carrier range from about 0.1% by weight to about 25% by weight, more preferably from about 0.5% by weight to about 10% by weight, based on an entire weight of the aqueous carrier.

The stain composition may also include one or more adjuvants, such as moisturizing agents, rheology-modifying agents, heat stabilizers, leveling agents, sedimentation inhibitors, ultraviolet-light absorbers, biological agents, plasticizers, and combinations thereof.

Moisturizing agents may be included to reduce crusting of various components of the stain composition (e.g., one or more of the colorants). Suitable moisturizing agents for use in the stain composition include glycolic compounds, such as polypropylene glycol. Preferred concentrations of the moisturizing agents in the stain composition range from about 0.01% by weight to about 1.00% by weight, more preferably from about 0.10% by weight to about 0.50% by weight, based on the entire weight of the stain composition.

Examples of suitable rheology-modifying agents include thixiotropic materials, fillers, and thickeners (e.g., associative and cellulosic thickeners). Examples of suitable thixiotropic materials include polyamides, oxidized polyethylenes, and combinations thereof. Examples of suitable fillers include silicon dioxides, talc, woolastonites, mica, alumina trihydrates, clays, silica quartz, calcium carbonates, magnesium carbonates, barium carbonates, calcium sulfates, magnesium sulfates, and combinations thereof. Preferred concentrations of rheology-modifying agents in the stain composition range from about 0.01% by weight to about 1.00% by weight, more preferably from about 0.02% by weight to about 0.50% by weight, based on the entire weight of the stain composition.

Suitable biological agents for use in the stain composition include bactericides, anti-fungal agents, and combinations thereof. Examples of suitable commercially available biological agents for use in the stain composition include bactericides available under the trade designation "BIOBAN" Biocides from The Dow Chemical Company, Midland, Mich. Preferred concentrations of the biological agents in the stain composition range from about 0.01% by weight to about 1.00% by weight, more preferably from about 0.05% by weight to about 0.50% by weight, based on the entire weight of the stain composition.

The stain composition may be prepared using techniques and equipment that are familiar to persons skilled in the art. For example, the carrier liquid and the one or more surfactants may be introduced to a mixing vessel and agitated. While maintaining the agitation, the one or more polymeric binders, the one or more anti-ticking agents, any included adjuvants, and the one or more colorants may be introduced to the mixing vessel to suspend the charged components in the carrier liquid.

In one embodiment, an inert suspension may be initially prepared for the anti-ticking agent. In this embodiment, the inert suspension may include the anti-ticking agent and one or more of the surfactants in a first carrier liquid. Preferred concentrations of the hydrous aluminum silicate in the inert suspension include concentrations of at least about 30% by weight, more preferably from about 40% by weight to about 90% by weight, and more preferably from about 50% by weight to about 75% by weight, based on an entire weight of the inert suspension. Preferred concentrations of the one or more surfactants in the inert suspension range from about 5% by weight to about 30% by weight, more preferably from about 10% by weight to about 20% by weight, based on the entire weight of the inert suspension. Preferred concentrations of the first carrier liquid in the inert suspension range from about 5% by weight to about 50% by weight, more preferably from about 10% by weight to about 25% by weight, based on the entire weight of the inert suspension.

The inert suspension may also include one or more of the above-discussed adjuvants. The anti-ticking agent, the one or more surfactants, and any included adjuvants may be mixed in the first carrier liquid under agitation to prepare the inert suspension. The resulting viscosity of the inert suspension may vary depending on the amount of the anti-ticking agent contained in the inert suspension. For example, embodiments that include lower concentrations of the anti-ticking agent may exhibit lower viscosities comparable to a syrupy consistency. Alternatively, embodiments that include higher concentrations of the anti-ticking agent may exhibit higher viscosities, such as thick paste viscosities.

When preparing the stain composition with the inert suspension, a second carrier liquid and one or more of the surfactants may be introduced to a second mixing vessel and agitated. The first and second carrier liquids may compositionally be substantially the same or different. Furthermore, the one or more surfactants introduced to the second mixing vessel may compositionally be substantially the same or different from the one or more surfactants of the inert suspension.

While maintaining the agitation, the one or more polymeric binders, the inert suspension, any included adjuvants, and the one or more colorants may be introduced to the mixing vessel to suspend the introduced components in the combined first and second carrier liquids. The components of the stain composition may be introduced serially in any suitable order, or they may be introduced together. Preferred concentrations of the inert suspension in the resulting stain composition range from about 1% by weight to about 25% by weight, more preferably from about 5% by weight to about 15% by weight, based on the entire weight of the stain composition.

The inert suspension allows the anti-ticking agent to be suspended in a portion of the carrier liquid prior to be introduced to the second mixing vessel. This may allow the anti-ticking agent to be readily suspended in the combined carrier liquids, thereby reducing the time required to prepare the stain composition. Furthermore, the use of the inert suspension may allow the anti-ticking agent to be provided in an inert suspension master batch, which may then be introduced to a variety of different stains.

The resulting stain composition may be applied to a substrate (e.g., a wood substrate) using any conventional manner, and is particularly suitable for spraying applications. Accordingly, the stain composition may be sprayed onto a substrate, where it may absorb into one or more portions of the substrate and then dried. As discussed above, the stain composition desirably forms a network of the anti-ticking agent in the one or more polymeric binders, which may at least partially cover one or more of the pores and soft regions of the substrate. This network desirably restricts uneven penetration of the colorants into the substrate to distribute the colorants in a more uniform manner. The resulting stained substrate may thereby exhibit a more uniform color with less contrast (i.e., less ticking).

The stained substrate may be dried passively (e.g., air dried) or actively (e.g., forced dried). Suitable durations for passive drying conditions (e.g., at about 25° C.) range from about 10 minutes to about 60 minutes. Alternatively, suitable durations for active drying conditions (e.g., at about 50° C.) range from about 1 minute to about 5 minutes. In embodiments in which the polymeric binders are air-curable, the drying process may cause initiate the crosslinking to cure the polymeric binders. Alternatively, in embodiments in which the polymeric binders include photo- or thermally-activated, cross-linkable groups, the stained substrate may be subjected to a suitable actinic radiation source (e.g., ultraviolet radiation) or temperature, respectively.

After the stain composition is dried, or at least substantially dried, one or more subsequent sealers and topcoats may be applied to the stained substrate to seal the stained surface and to provide protective and/or aesthetic qualities. For example, a sealer clearcoat may be applied to the stained substrate, cured (e.g., photocured), and abraded to provide a smooth clearcoat surface. A subsequent clear topcoat may then be applied and cured (e.g., photocured). The sealers and topcoats may be formulated from a variety of materials, such as polyurethane, thermoplastic acrylates, and combinations thereof.

In addition to reducing ticking in the stained substrate, the anti-ticking agent in the stain composition may also provide more hold out and fullness with subsequent sealers and topcoats. In particular, the resulting stained substrate desirably exhibits a more uniform topography, with less peaks and valleys along the stained surface. This may provide a good seal that desirably restricts penetration of the subsequent sealers and topcoats, thereby providing more fullness in the resulting coated substrate. Accordingly, the stain composition of the present disclosure may be applied to a variety of substrates with reduced ticking, more hold out and fullness, and while also providing a variety of different stain colors to the receiving substrates.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

A waterborne stain composition of Example 1 was prepared by initially preparing an inert suspension containing a hydrous aluminum silicate anti-ticking agent. Table 1 lists the component concentrations of the inert suspension by weight.

TABLE 1

| Inert suspension Components | Percent by Weight |
|---|---|
| Water | 19.5 |
| Anti-ticking agent | 64.6 |
| 190 surfactant | 13.4 |
| 104-A surfactant | 0.5 |
| Polypropylene glycol | 1.9 |
| Bactericide | 0.1 |

The "anti-ticking agent" was a fine-grain, hydrous aluminum silicate commercially available under the trade designation "ASP ULTRAFINE" hydrous aluminosilicates from BASF Corporation, Florham Park, N.J.; the "190 surfactant" was a first dispersing/wetting agent surfactant commercially available under the trade designation "DISPERBYK" from Byk USA, Inc., Wallingford, Conn.; the "104-A surfactant" was a second dispersing/wetting agent surfactant commercially available under the trade designation "SURFYNOL 104-A" from Air Products and Chemicals, Inc., Allentown, Pa.; and the "bactericide" was a bioligcal agent commercially available under the trade designation "BIOBAN CS-135" Biocide from The Dow Chemical Company, Midland, Mich.

The inert suspension was prepared by mixing the water, the 190 surfactant, the 104-A surfactant in a first mixing vessel under agitation. The anti-ticking agent, the polypropylene glycol, and the bactericide were then introduced to the first mixing vessel and mixed to suspend the components in the water. The resulting inert suspension exhibited a thick flowable viscosity. The inert suspension was then used to prepare the stain composition of Example 1. Table 2 lists the component concentrations of the stain composition of Example 1 by weight, with reference to the overall inert suspension.

TABLE 2

| Stain Composition Components | Percent by Weight |
| --- | --- |
| Water | 74.8 |
| Isopropyl alcohol | 0.5 |
| 104-A surfactant | 0.3 |
| Inert suspension | 8.7 |
| Polymeric binder | 10.9 |
| Bactericide | 0.1 |
| Tint colorants | 4.7 |

The polymeric binder was a polyurethane-acrylate binder resin available from Valspar Corporation, Minneapolis, Minn.

The stain composition was prepared by mixing the water, the isopropyl alcohol, and the 104-A surfactant in a second mixing vessel under agitation. The inert suspension, the polymeric binder, and the bactericide were then introduced to the second mixing vessel and mixed to suspend the components in the water/isopropyl alcohol aqueous carrier. The tint colorants were then introduced to the second mixing vessel and mixed to also suspend the tint colorants in the aqueous carrier. Table 3 lists the component concentrations of the stain composition of Example 1 by weight, with reference to the individual components of the inert suspension.

TABLE 3

| Stain Composition Components | Percent by Weight |
| --- | --- |
| Water | 76.5 |
| Isopropyl alcohol | 0.5 |
| Anti-ticking agent | 5.6 |
| 190 surfactant | 1.2 |
| 104-A surfactant | 0.3 |
| Polymeric binder | 10.9 |
| Polypropylene glycol | 0.2 |
| Bactericide | 0.1 |
| Tint colorants | 4.7 |

A waterborne stain composition of Comparative Example A was prepared in a similar manner to that discussed above for the stain composition of Example 1, except that the stain composition of Comparative Example A did not include the inert suspension having the anti-ticking agent.

The stain compositions of Example 1 and Comparative Example A were then spray coated onto wood substrates and dried at 50° C. for 2 minutes. A polyurethane-based clearcoat was then applied to each of the stained wood substrates and photocured to form a sealer coating. Each cured sealer coating was then sanded to provide substantially smooth surfaces. An additional polyurethane-based clearcoat was then applied to each smooth sealer coating and photocured.

Figure 2:
FIG. 2 is a photograph of a wood substrate coated with a comparative stain composition and additional clearcoats.

FIG. 1 shows the stained and coated wood substrate prepared with the stain composition of Example 1, and FIG. 2 shows the stained and coated wood substrate prepared with the stain composition of Comparative Example A. As shown in FIG. 2, the wood substrate stained with the stain composition of Comparative Example A exhibited dark colors at the porous and soft regions of the wood substrate, which are visibly recognizable relative to the lighter stained surface regions of the wood substrate. In comparison, as shown in FIG. 1, the wood substrate stained with the stain composition of Example 1 exhibited with less contrast in color between the porous and soft regions of the wood substrate and the remaining surface regions of the wood substrate (i.e., less ticking).

While not wishing to be bound by theory, as discussed above, this is believed to be due to a network of the hydrous aluminum silicate covering one or more of the pores and soft regions of a substrate, thereby restricting uneven penetration of the colorants into the wood substrate. As shown, the resulting stained wood substrate exhibited a more uniform color with less contrast. Accordingly, the use of the hydrous aluminum silicate in the stain composition of the present disclosure may provide a more uniform and full color to receiving substrates, which may increase the aesthetic qualities of the substrates.

Although the present disclosure has been described with reference to preferred embodiments, workers skilled in the art will recognize that changes may be made in form and detail without departing from the spirit and scope of the disclosure.

The invention claimed is:

1. A stain composition comprising:
an inert suspension including
an aqueous carrier liquid:
at least one anti-ticking agent having a concentration in the stain composition ranging from about 3.0% by weight, based on an entire weight of the stain composition;
at least one colorant; and
at least one surfactant configured to at least partially suspend the at least one anti-ticking agent in the carrier liquid;
wherein the stain composition is used with soft and porous substrates.

2. The stain composition of claim 1, wherein the concentration of the at least one silicate-based anti-ticking agent ranges from about 5.0% by weight to about 10.0% by weight.

3. The stain composition of claim 1, wherein the at least one silicate-based anti-ticking agent comprises hydrous aluminum silicate.

4. The stain composition of claim 3, wherein the hydrous aluminum silicate has an average particle size of about 2.0 micrometers or less.

5. The stain composition of claim 1, wherein the polymeric binder comprises a polyurethane copolymer resin.

6. The stain composition of claim 5, wherein the polyurethane copolymer resin comprises ethylenically-unsaturated groups.

7. The stain composition of claim 1, wherein the at least one surfactant has a concentration in the stain composition ranging from about 0.1% by weight to about 5% by weight.

8. The stain composition of claim 1, and further comprising an adjuvant selected from the group consisting of moisturizing agents, rheology-modifying agents, heat stabilizers, leveling agents, sedimentation inhibitors, ultraviolet-light absorbers, biological agents, plasticizers, and combinations thereof.

9. A stain composition comprising:
an inert suspension including
an aqueous carrier liquid;
at least one silicate-based material having an average particle size of about 2.0 micrometers or less, wherein the at least one silicate-based material has a concentration in the stain composition of at least about 3% by weight, based on an entire weight of the stain composition;

at least one colorant; and
at least one surfactant configured to at least partially suspend the at least one silicate-based material in the carrier liquid;
wherein the stain composition is used with soft and porous substrates.

10. The stain composition of claim 9, wherein the average particle size of the at least one silicate-based material is about 1.0 micrometer or less.

11. The stain composition of claim 9, and further comprising a polymer binder.

12. The stain composition of claim 9, wherein the at least one silicate-based material comprises aluminum oxide and silicon dioxide.

13. The stain composition of claim 9, wherein the concentration of the at least one silicate-based material ranges from about 5.0% by weight to about 10.0% by weight.

14. The stain composition of claim 9, wherein the at least one surfactant has a concentration in the stain composition ranging from about 0.1% by weight to about 5% by weight.

15. The stain composition of claim 9, wherein the concentration of the carrier liquid ranges from about 70% by weight to about 80% by weight.

\* \* \* \* \*